R. McCLURE.
ANIMAL TRAP.
APPLICATION FILED FEB. 14, 1914.
1,157,882.
Patented Oct. 26, 1915.
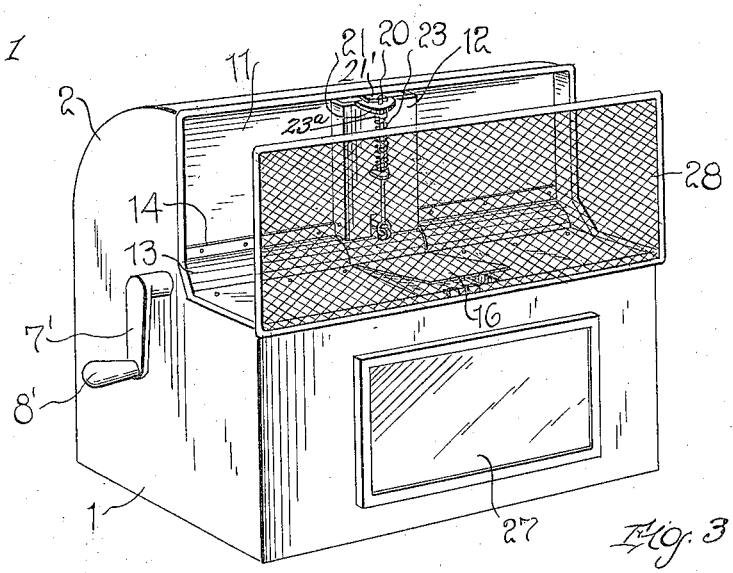
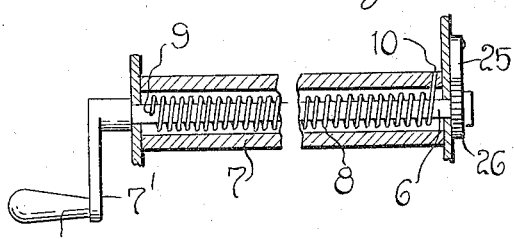
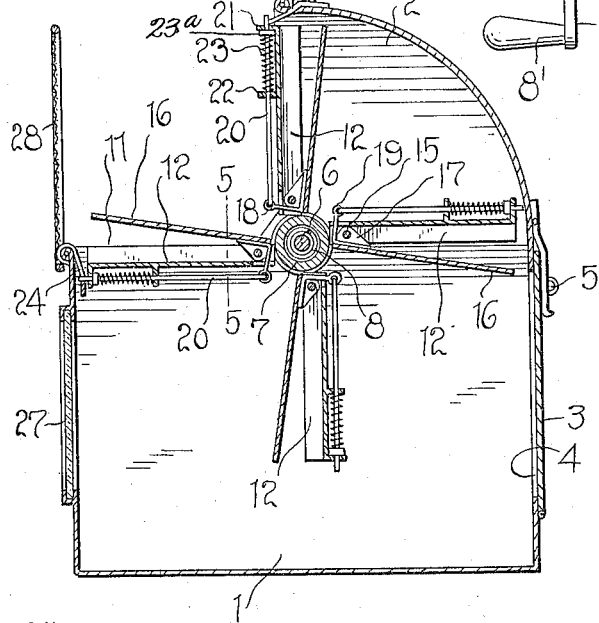
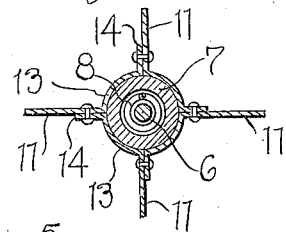
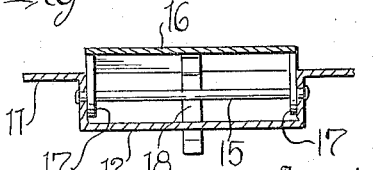
Inventor
R. McCLURE
Witnesses
By Watson E. Coleman
Attorney

UNITED STATES PATENT OFFICE.

RAY McCLURE, OF VAN WERT, OHIO.

ANIMAL-TRAP.

1,157,882.

Specification of Letters Patent. Patented Oct. 26, 1915.

Application filed February 14, 1914. Serial No. 818,756.

*To all whom it may concern:*

Be it known that I, RAY McCLURE, a citizen of the United States, residing at Van Wert, in the county of Van Wert and State of Ohio, have invented certain new and useful Improvements in Animal-Traps, of which the following is a specification, reference being had to the accompanying drawings.

This invention relates to new and useful improvements in animal traps and more particularly to that type known as self-set and ever set traps, the main object of the invention being to provide a trap of this character which is so constructed and arranged that the same is operated by the weight of an animal upon the trigger and is always retained in its set position.

Another object of the present invention is the provision of a trap which includes a body, a rotatable fan member disposed therein, the blades of which are arranged, one at a time, in a horizontal position and retained in such position until released by the weight of an animal upon the trigger members carried by the fan blades, the weight of the animal moving the horizontal fan blades to a vertical position and moving the fan blade next in order to a horizontal or set position, each blade carrying separate means adapted for engagement by means carried by the body for retaining said blades in a set position.

A further object of the invention resides in the provision of a trap of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to and more particularly pointed out in the specification and claims.

In the accompanying drawings forming a part of this application Figure 1 is a perspective view of an animal trap constructed in accordance with my invention. Fig. 2 is a transverse sectional view through the same. Fig. 3 is a longitudinal sectional view through the shaft and sleeve inclosing the same. Fig. 4 is a detail enlarged transverse section illustrating the manner of mounting the fan blades; and Fig. 5 is an enlarged transverse section taken on the line 5—5, Fig. 2.

In carrying out my invention, I provide a substantially rectangular body 1 which is provided upon the top side, with a hood 2, which preferably extends transversely across one half of the top of the body. The body 1 is provided upon what will be hereinafter known as the rear side, with a hinged door 3 which is adapted to normally close an opening 4 in the rear of the body and is retained in its normal position by means of a latch member 5.

Extending longitudinally through the body and having its ends mounted within suitable bearings in the end walls of the body, near the top thereof, is a shaft 6 to one end of which is secured a crank arm 7' having a handle member 8', whereby said shaft may be rotated, when desired. Mounted upon the shaft and arranged in spaced relation therewith, is a sleeve 7 and disposed within the sleeve, is a coil spring 8 which is adapted to inclose the shaft 6, said spring having one end secured to the shaft as shown at 9 and the other end secured to the interior of the sleeve 7, as shown at 10.

Mounted upon the sleeve 7, are the blades 11 which are preferably formed of sheet metal or galvanized iron and provided at their central portions with an offset 12 which forms a central groove, the purpose of which will be more fully described hereinafter. The inner longitudinal edges of the blades 11 are provided upon each side of the offset 12, with substantially arcuate flanges 13 which are adapted to be disposed over a portion of the sleeve 7 and then bent at right angles, as shown at 14 and riveted or otherwise secured to the blade next in order, each of said blades being formed in this manner so that they are all rigidly connected together and mounted upon the sleeve 7. This construction is clearly illustrated in Fig. 4.

Pivotally mounted in the side walls of the offsets 12 are the transverse rods 15 and arranged within the offsets are the trigger blades 16 having spaced ears 17 formed upon the inner ends thereof which are perforated and are adapted to be pivotally mounted upon the rods 15. These trigger blades 16 are adapted to be normally retained in a raised or set position, as illustrated in Fig. 2 by means of the angular retaining members 18, one end of each of which is arranged between the rods 15 and the under sides of the trigger blades 16. The other ends of the retaining members extend downwardly and are provided with loops 19 to which are secured the actuating rods 20. The outer ends of the offsets 12 are provided with the downwardly projecting guide flanges 21 and further provided adjacent their outer ends with the downwardly projecting perforated ears 22 in which the rods 20 are mounted. Mounted upon the rods 20 and disposed between the guide flanges 21, and the ears 22, are the coil springs 23 which are adapted to normally retain the outer ends of the rods 20 in their projected positions, and the outward movement of the rods is limited by the contact with the flanges 21 of the stop members 23ª carried by said rods.

In Fig. 2 I have illustrated one of the blades 11 in its operative or set position and in this position the outer end of the actuating rod is engaged with the keeper 24 secured to the inner side of the body 1, so as to normally retain the blade in its operative position until the trigger 16 is actuated to release the rod 20. It will be apparent that in placing the bait in position, it is preferred to have the same positioned upon the trigger 16, at the inner end thereof, so that the animal attempting to obtain the same will necessarily step upon the trigger in such a manner that any slight pressure upon the same will disengage the outer end of the rod 20 from the keeper 24 and release the blade 11, the tension of the coil spring 8 rotating the sleeve 7 and blades 11 so that the animal will be conveyed to the interior of the body 1.

In setting my trap for use, the shaft 6 is rotated to place the spring 8 under tension, said shaft being held against any backward movement by means of the pivoted pawl 25 engaging with the ratchet 26 upon the end of the shaft opposite the handle. It will be apparent from the description taken in connection with the drawings, that when the trigger 16 is pressed downwardly into the offset 12, it will actuate the retaining member 18 which, in turn, will reciprocate the rod 20 against the tension of the spring 23 and disengage the outer end of the rod from the keeper 24 to allow the set blade to rotate inwardly into the receptacle, the blade next in turn dropping downward to the set position. It will be noted that the fan member is retarded in its downward rotary movement by having the outer ends of each one of the rods 20 frictionally engaging with the stop 21', which is secured to the upper edge of the hood 2 and projects downwardly and outwardly therefrom, the lower inner face of said stop being beveled whereby to readily permit the ends of the rod to engage the same and pass beneath it, when the fan member is rotating forwardly. It will be noted that in view of the fact that the member 24 is U-shaped, there is no other means for preventing downward movement of the fan member outside of the stop 21' and it is, therefore, essential that this stop member be located in the position illustrated in Figs. 1 and 2, so as to be engaged by the outer ends of the rods 20, so that the axial rotation of the fan member is materially retarded before a rod 20 operatively engages the keeper 24. It will be apparent that after the blade has been released, the tension of the spring 8 will rotate the blades until the blade next in order is disposed in set position. From this, it will be apparent that I have provided what is known as the self set or ever set animal trap. If so desired, a suitable window 27 may be located in the front of the receptacle 1 to attract the animals from the outside by disclosing the animals engaged within the trap.

In the construction of the trap, I have provided a suitable guard 28 which is secured to the upper longitudinal edge of the front wall of the receptacle and projects upwardly to a height about equal to the height of the forward side of the hood 2. In providing this guard 28, the animals will have to enter upon the set blade from the end thereof and in attempting to cross the same or in obtaining the bait, the trigger 16 will be actuated to release the blade, which will deposit the animal within the trap. It will be noted that by arranging the guard 28 upon the outer edge of the body and in spaced relation to the hood 2, it will provide a raceway for the animal when passing on to the fan blades and will prevent the animal from escaping when the trigger is released, whereas if it were not for this guard member, the animal could readily spring over the forward edge of the body and escape, but by providing the guard member 28, it will necessitate the animal traveling to the end of the race-way, which will be practically impossible as the weight of the animal will carry it into the body of the trap before it can reach the end of the race-way. When it is desired to remove the contents of the trap, this may be done through the opening 4 by disengaging the latch 5.

It will be apparent from the accompanying drawing, taken in connection with the foregoing description, that I have provided a simple and durable animal trap, whereby the operation of setting the trap in its effective position is carried out through the weight of an animal and whereby the trap is always in an ever set position. It will also be apparent that the device is extremely simple in construction, can be formed of any desirable material and manufactured and placed upon the market at a comparatively small cost.

While I have shown and described the preferred form of my invention, it is obvious that various changes in the details of construction and in the proportions may be resorted to, for successfully carrying my invention into practice, without sacrificing any of the novel features or departing from the scope of the appended claim.

Having thus described this invention, what I claim is:—

A device of the character described including a rotatably supported tubular sleeve, blades carried by said sleeve and substantially radiating therefrom, the inner marginal portion of each of the blades being arcuate to conform to the periphery of the sleeve and terminating in a radial portion overlying the inner portion of an adjacent blade, means for securing a blade and an adjacent radial extension one to the other, and a spring member within the tubular sleeve for imparting movement to the sleeve in one direction.

In testimony whereof I hereunto affix my signature in the presence of two witnesses.

RAY McCLURE.

Witnesses:
C. B. LYBARGER,
J. W. SPURDGEON.

Copies of this patent may be obtained for five cents each, by addressing the "Commissioner of Patents, Washington, D. C."